United States Patent
Thokchom et al.

(10) Patent No.: US 10,333,123 B2
(45) Date of Patent: Jun. 25, 2019

(54) HIGH CAPACITY SOLID STATE COMPOSITE CATHODE, SOLID STATE COMPOSITE SEPARATOR, SOLID-STATE RECHARGEABLE LITHIUM BATTERY AND METHODS OF MAKING SAME

(71) Applicant: Johnson IP Holding, LLC, Atlanta, GA (US)

(72) Inventors: Joykumar S. Thokchom, Atlanta, GA (US); Davorin Babic, Marietta, GA (US); Lonnie G. Johnson, Atlanta, GA (US); Lazbourne Alanzo Allie, McDonough, GA (US); David Ketema Johnson, Smyrna, GA (US); William Rauch, Douglasville, GA (US)

(73) Assignee: Johnson IP Holding, LLC, Atlanta, GA (US)

( * ) Notice: Subject to any disclaimer, the term of this patent is extended or adjusted under 35 U.S.C. 154(b) by 400 days.

(21) Appl. No.: 14/382,194

(22) PCT Filed: Mar. 1, 2013

(86) PCT No.: PCT/US2013/028672
§ 371 (c)(1),
(2) Date: Aug. 29, 2014

(87) PCT Pub. No.: WO2013/131005
PCT Pub. Date: Sep. 6, 2013

(65) Prior Publication Data
US 2015/0333307 A1     Nov. 19, 2015

Related U.S. Application Data

(60) Provisional application No. 61/605,241, filed on Mar. 1, 2012, provisional application No. 61/606,840, filed on Mar. 5, 2012.

(51) Int. Cl.
*H01M 2/14*     (2006.01)
*H01M 2/16*     (2006.01)
(Continued)

(52) U.S. Cl.
CPC ......... *H01M 2/145* (2013.01); *H01M 2/1646* (2013.01); *H01M 2/1686* (2013.01);
(Continued)

(58) Field of Classification Search
None
See application file for complete search history.

(56) References Cited

U.S. PATENT DOCUMENTS 3,237,078 A    2/1966   Mallory
3,393,355 A    7/1968   Whoriskey et al.
(Continued)

FOREIGN PATENT DOCUMENTS

CN       101434417 A     5/2009
DE    102004010892 B3   11/2005
(Continued)

OTHER PUBLICATIONS

Ramzy et al. "Tailor-Made Development of Fast Li Ion Conducting Garnet-Like Solid Electrolytes." ACS Appl. Mater. Interfaces, 2010, 2 (2), pp. 385-390.*
(Continued)

*Primary Examiner* — Alix E Eggerding
(74) *Attorney, Agent, or Firm* — Panitch Schwarze Belisario & Nadel LLP (57) ABSTRACT

A high capacity solid state composite cathode contains an active cathode material dispersed in an amorphous inorganic ionically conductive metal oxide, such as lithium lanthanum zirconium oxide and/or lithium carbon lanthanum zirconium oxide. A solid state composite separator contains an electronically insulating inorganic powder dispersed in an amor-
(Continued)

phous, inorganic, ionically conductive metal oxide. Methods for preparing the composite cathode and composite separator are provided.

3 Claims, 2 Drawing Sheets

(51) Int. Cl.

| | | |
|---|---|---|
| H01M 4/485 | (2010.01) | |
| H01M 4/58 | (2010.01) | |
| H01M 4/136 | (2010.01) | |
| H01M 4/36 | (2006.01) | |
| H01M 4/04 | (2006.01) | |
| H01M 4/131 | (2010.01) | |
| H01M 4/1391 | (2010.01) | |
| H01M 4/505 | (2010.01) | |
| H01M 4/525 | (2010.01) | |
| H01M 4/62 | (2006.01) | |
| H01M 10/052 | (2010.01) | |
| H01M 10/0562 | (2010.01) | |
| H01M 10/0585 | (2010.01) | |
| H01M 4/02 | (2006.01) | |

(52) U.S. Cl.
CPC ....... *H01M 4/0404* (2013.01); *H01M 4/0435* (2013.01); *H01M 4/0471* (2013.01); *H01M 4/131* (2013.01); *H01M 4/136* (2013.01); *H01M 4/1391* (2013.01); *H01M 4/364* (2013.01); *H01M 4/485* (2013.01); *H01M 4/505* (2013.01); *H01M 4/525* (2013.01); *H01M 4/5825* (2013.01); *H01M 4/621* (2013.01); *H01M 4/625* (2013.01); *H01M 10/052* (2013.01); *H01M 10/0562* (2013.01); *H01M 10/0585* (2013.01); *H01M 2004/028* (2013.01); *H01M 2300/0068* (2013.01)

(56) References Cited

U.S. PATENT DOCUMENTS

| | | |
|---|---|---|
| 4,299,682 A | 11/1981 | Oda et al. |
| 4,303,877 A | 12/1981 | Meinhold |
| 4,352,068 A | 9/1982 | Weppner |
| 4,386,020 A | 5/1983 | Hartwig et al. |
| 4,419,421 A | 12/1983 | Wichelhaus et al. |
| 4,495,078 A | 1/1985 | Bell et al. |
| 4,513,069 A | 4/1985 | Kreuer et al. |
| 4,526,855 A | 7/1985 | Hartwig et al. |
| 4,614,905 A | 9/1986 | Petersson et al. |
| 4,654,281 A | 3/1987 | Anderman et al. |
| 4,704,341 A | 11/1987 | Weppner et al. |
| 4,710,848 A | 12/1987 | Schlechtriemen et al. |
| 4,719,401 A | 1/1988 | Altmejd |
| 4,777,119 A | 10/1988 | Brault et al. |
| 4,792,752 A | 12/1988 | Schlechtriemen et al. |
| 4,885,267 A | 12/1989 | Takahara et al. |
| 4,931,214 A | 6/1990 | Worrell et al. |
| 5,023,153 A | 6/1991 | Weppner |
| 5,202,788 A | 4/1993 | Weppner |
| 5,260,821 A | 11/1993 | Chu et al. |
| 5,270,635 A | 12/1993 | Hoffman et al. |
| 5,291,116 A | 3/1994 | Feldstein |
| 5,314,765 A | 5/1994 | Bates |
| 5,322,601 A | 6/1994 | Liu et al. |
| 5,336,573 A | 8/1994 | Zuckerbrod et al. |
| 5,338,625 A | 8/1994 | Bates et al. |
| 5,362,581 A | 11/1994 | Chang et al. |
| 5,387,857 A | 2/1995 | Honda et al. |
| 5,411,592 A | 5/1995 | Ovshinsky et al. |
| 5,445,906 A | 8/1995 | Hobson et al. |
| 5,455,126 A | 10/1995 | Bates et al. |
| 5,474,959 A | 12/1995 | Schafer et al. |
| 5,512,147 A | 4/1996 | Bates et al. |
| 5,522,955 A | 6/1996 | Brodd |
| 5,561,004 A | 10/1996 | Bates et al. |
| 5,567,210 A | 10/1996 | Bates et al. |
| 5,569,520 A | 10/1996 | Bates |
| 5,597,660 A | 1/1997 | Bates et al. |
| 5,612,152 A | 3/1997 | Bates |
| 5,654,084 A | 8/1997 | Egert |
| 5,705,293 A | 1/1998 | Hobson |
| 5,778,515 A | 7/1998 | Menon |
| 5,783,333 A | 7/1998 | Mayer |
| 5,783,928 A | 7/1998 | Okamura |
| 5,811,205 A | 9/1998 | Andrieu et al. |
| 5,821,733 A | 10/1998 | Turnbull |
| 6,022,642 A | 2/2000 | Tsukamoto et al. |
| 6,139,986 A | 10/2000 | Kurokawa et al. |
| 6,168,884 B1 | 1/2001 | Neudecker et al. |
| 6,182,340 B1 | 2/2001 | Bishop |
| 6,201,123 B1 | 3/2001 | Daikai et al. |
| 6,242,129 B1 | 6/2001 | Johnson |
| 6,255,122 B1 | 7/2001 | Duncombe et al. |
| 6,387,563 B1 | 5/2002 | Bates |
| 6,413,672 B1 | 7/2002 | Suzuki et al. |
| 6,541,161 B1 | 4/2003 | Scanlon, Jr. |
| 6,679,926 B1 | 1/2004 | Kajiura et al. |
| 6,827,921 B1 | 12/2004 | Singhal et al. |
| 6,852,139 B2 | 2/2005 | Zhang et al. |
| 6,886,240 B2 | 5/2005 | Zhang et al. |
| 6,887,612 B2 | 5/2005 | Bitterlich et al. |
| 7,510,800 B2 | 3/2009 | Yoshida et al. |
| 7,524,580 B1 | 4/2009 | Birke et al. |
| 7,540,886 B2 | 6/2009 | Zhang et al. |
| 7,557,055 B2 | 7/2009 | Zhang et al. |
| 7,732,096 B2 | 6/2010 | Thackeray et al. |
| 7,776,478 B2 | 8/2010 | Klaassen |
| 7,824,795 B2 | 11/2010 | Yoshida et al. |
| 7,901,658 B2 | 3/2011 | Weppner et al. |
| 7,914,932 B2 | 3/2011 | Yoshida et al. |
| 7,998,622 B2 | 8/2011 | Inda |
| 8,092,941 B2 | 1/2012 | Weppner et al. |
| 8,173,292 B2 | 5/2012 | Kato |
| 8,192,869 B2 | 6/2012 | Teramoto |
| 8,211,496 B2 | 7/2012 | Johnson et al. |
| 8,221,916 B2 | 7/2012 | Inda |
| 8,383,268 B2 | 2/2013 | Inda |
| 8,431,287 B2 | 4/2013 | Teramoto |
| 8,476,174 B2 | 7/2013 | Inda |
| 8,808,407 B2 | 8/2014 | Inda |
| 8,822,077 B2 | 9/2014 | Katoh |
| 8,852,816 B2 | 10/2014 | Ogasa |
| 8,883,355 B2 | 11/2014 | Inda |
| 8,951,681 B2 | 2/2015 | Katoh |
| 9,034,525 B2 | 5/2015 | Babic et al. |
| 9,153,838 B2 | 10/2015 | Ogasa |
| 9,159,989 B2 | 10/2015 | Ogasa |
| 9,266,780 B2 | 2/2016 | Ogasa |
| 9,379,375 B2 | 6/2016 | Sugiura et al. |
| 9,413,033 B2 | 8/2016 | Ogasa |
| 9,425,454 B2 | 8/2016 | Sugiura et al. |
| 2001/0014505 A1 | 8/2001 | Duncombe et al. |
| 2002/0000541 A1 | 1/2002 | Sasaki et al. |
| 2002/0008706 A1 | 4/2002 | Mayes et al. |
| 2002/0048706 A1 | 4/2002 | Mayes et al. |
| 2002/0119375 A1 | 8/2002 | Zhang |
| 2003/0012996 A1 | 1/2003 | Bitterlich et al. |
| 2003/0030039 A1 | 2/2003 | Sasaki et al. |
| 2003/0118897 A1 | 6/2003 | Mino et al. |
| 2004/0081888 A1 | 4/2004 | Thackeray et al. |
| 2004/0101761 A1 | 5/2004 | Park et al. |
| 2004/0111874 A1 | 6/2004 | Schierle-Arndt et al. |
| 2004/0118700 A1 | 6/2004 | Schierle-Arndt et al. |
| 2004/0151986 A1 | 8/2004 | Park et al. |
| 2004/0191617 A1 | 9/2004 | Visco et al. |
| 2005/0084758 A1 | 4/2005 | Yamamoto et al. |
| 2005/0266150 A1 | 12/2005 | Yong et al. |
| 2006/0046149 A1 | 3/2006 | Yong et al. |
| 2006/0068282 A1 | 3/2006 | Kishi et al. |
| 2006/0093916 A1 | 5/2006 | Howard et al. |

(56) References Cited

U.S. PATENT DOCUMENTS

| | | |
|---|---|---|
| 2006/0165578 A1 | 7/2006 | Sasaki et al. |
| 2006/0246355 A1 | 11/2006 | Min et al. |
| 2006/0287188 A1 | 12/2006 | Borland et al. |
| 2007/0031323 A1 | 2/2007 | Baik et al. |
| 2007/0048617 A1 | 3/2007 | Inda |
| 2007/0087269 A1 | 4/2007 | Inda |
| 2007/0148545 A1 | 6/2007 | Amine et al. |
| 2007/0148553 A1 | 6/2007 | Weppner |
| 2007/0231704 A1 | 10/2007 | Inda |
| 2007/0264579 A1 | 11/2007 | Ota |
| 2008/0220334 A1 | 9/2008 | Inda |
| 2008/0241698 A1 | 10/2008 | Katoh |
| 2008/0268346 A1 | 10/2008 | Inda |
| 2009/0004371 A1 | 1/2009 | Johnson et al. |
| 2009/0068563 A1 | 3/2009 | Kanda et al. |
| 2009/0081554 A1 | 3/2009 | Takada et al. |
| 2009/0081555 A1 | 3/2009 | Teramoto |
| 2009/0092903 A1* | 4/2009 | Johnson .............. H01M 4/0471 429/322 |
| 2009/0098281 A1 | 4/2009 | Zhang et al. |
| 2009/0142669 A1* | 6/2009 | Shinohara ................. C03B 5/06 429/320 |
| 2009/0162755 A1* | 6/2009 | Neudecker .......... C23C 14/0036 429/319 |
| 2009/0194222 A1 | 8/2009 | Teramoto |
| 2009/0197178 A1 | 8/2009 | Inda |
| 2009/0197182 A1 | 8/2009 | Katoh |
| 2009/0214957 A1 | 8/2009 | Okada et al. |
| 2009/0274832 A1 | 11/2009 | Inda |
| 2010/0028782 A1 | 2/2010 | Inda |
| 2010/0047696 A1 | 2/2010 | Yoshida et al. |
| 2010/0203383 A1 | 8/2010 | Weppner |
| 2011/0053001 A1 | 3/2011 | Babic et al. |
| 2011/0059369 A1 | 3/2011 | Nan et al. |
| 2011/0076542 A1 | 3/2011 | Farmer |
| 2011/0133136 A1 | 6/2011 | Weppner et al. |
| 2011/0177397 A1 | 7/2011 | Ogasa |
| 2011/0223460 A1 | 9/2011 | Farmer |
| 2011/0223467 A1 | 9/2011 | Shacklette et al. |
| 2011/0223487 A1 | 9/2011 | Johnson et al. |
| 2011/0300451 A1 | 12/2011 | Inda |
| 2011/0318650 A1 | 12/2011 | Zhang et al. |
| 2012/0100433 A1* | 4/2012 | Suyama ................. H01B 1/122 429/306 |
| 2012/0141881 A1 | 6/2012 | Geier et al. |
| 2012/0196189 A1 | 8/2012 | Babic et al. |
| 2012/0237834 A1 | 9/2012 | Ogasa |
| 2012/0251882 A1 | 10/2012 | Moon et al. |
| 2012/0264021 A1 | 10/2012 | Sugiura et al. |
| 2012/0270115 A1 | 10/2012 | Johnson |
| 2013/0011751 A1 | 1/2013 | Nakada et al. |
| 2013/0011752 A1 | 1/2013 | Tanaami et al. |
| 2013/0017454 A1* | 1/2013 | Sato ...................... H01M 4/131 429/322 |
| 2013/0095394 A1 | 4/2013 | Tanaami et al. |
| 2013/0164616 A1 | 6/2013 | Nakada et al. |
| 2013/0230777 A1 | 9/2013 | Babic et al. |
| 2013/0273437 A1 | 10/2013 | Yoshioka et al. |
| 2013/0309551 A1 | 11/2013 | Ogasa |
| 2013/0344416 A1 | 12/2013 | Sakamoto et al. |
| 2014/0008006 A1 | 1/2014 | Lee et al. |
| 2014/0011080 A1 | 1/2014 | Lee et al. |
| 2014/0011095 A1 | 1/2014 | Lee et al. |
| 2014/0023933 A1 | 1/2014 | Chiga et al. |
| 2014/0099538 A1 | 4/2014 | Johnson et al. |
| 2014/0099556 A1 | 4/2014 | Johnson et al. |
| 2014/0287305 A1 | 9/2014 | Wachsman et al. |
| 2015/0037688 A1 | 2/2015 | Otsuka et al. |
| 2015/0056518 A1 | 2/2015 | Babic et al. |
| 2015/0056520 A1 | 2/2015 | Thokchom et al. |
| 2016/0149261 A1* | 5/2016 | Zaghib ................. H01M 4/136 429/94 |

FOREIGN PATENT DOCUMENTS

| | | |
|---|---|---|
| DE | 102007030604 A1 | 1/2009 |
| EP | 0070020 A1 | 1/1983 |
| EP | 0033935 B1 | 8/1985 |
| EP | 0177062 A2 | 4/1986 |
| EP | 0190605 A2 | 8/1986 |
| EP | 0226955 A2 | 7/1987 |
| EP | 0232513 A2 | 8/1987 |
| EP | 0243975 A2 | 11/1987 |
| EP | 0249802 A2 | 12/1987 |
| EP | 0408039 A2 | 1/1991 |
| EP | 0227996 B1 | 7/1991 |
| EP | 0470597 A2 | 2/1992 |
| EP | 0693581 B1 | 5/1998 |
| EP | 1271683 A2 | 1/2003 |
| EP | 1431422 A1 | 6/2004 |
| EP | 1431423 A1 | 6/2004 |
| EP | 1237212 A3 | 4/2005 |
| EP | 2037527 A1 | 3/2009 |
| EP | 2086040 A2 | 8/2009 |
| EP | 2685551 A1 | 1/2014 |
| EP | 2706598 A1 | 3/2014 |
| JP | 2000311710 A | 11/2000 |
| JP | 2000331680 A | 11/2000 |
| JP | 2000331684 A | 11/2000 |
| JP | 2001-126757 A | 5/2001 |
| JP | 2001-243954 A | 9/2001 |
| JP | 2004127613 A | 4/2004 |
| JP | 2006261008 A | 9/2006 |
| JP | 2006-310295 A | 11/2006 |
| JP | 2009-176741 A | 8/2009 |
| JP | 2010067499 A | 3/2010 |
| JP | 2010-080426 A | 4/2010 |
| JP | 2010-129190 A | 6/2010 |
| JP | 2011134675 A | 7/2011 |
| JP | 2011150817 A | 8/2011 |
| JP | 2011249254 A | 12/2011 |
| JP | 2012-099315 A | 5/2012 |
| JP | 2012-146479 A | 8/2012 |
| JP | 2013-037992 A | 2/2013 |
| JP | 2013157084 A | 8/2013 |
| JP | 2015138741 A | 7/2015 |
| WO | 2005085138 A1 | 9/2005 |
| WO | 2007004590 A1 | 1/2007 |
| WO | 2009003695 A2 | 1/2009 |
| WO | 2009029746 A1 | 3/2009 |
| WO | 2011007445 A1 | 1/2011 |
| WO | WO 2011/125481 * | 10/2011 |
| WO | 2011156392 A1 | 12/2011 |
| WO | 2012008422 A1 | 1/2012 |
| WO | 2012018831 A1 | 2/2012 |
| WO | 2012128734 A1 | 9/2012 |
| WO | 2012144553 A1 | 10/2012 |
| WO | 2013049460 A1 | 4/2013 |
| WO | 2013085557 A1 | 6/2013 |
| WO | 2013130983 A2 | 9/2013 |
| WO | 2013131005 A2 | 9/2013 |
| WO | 2014/058684 A2 | 4/2014 |
| WO | 2014058683 A1 | 4/2014 |

OTHER PUBLICATIONS

Office Action dated Sep. 7, 2015 in JP Application No. 2014-560097, translation only.
Office Action dated Mar. 2, 2016 in CN Application No. 201380023413.5.
Office Action dated May 4, 2016 in KR Application No. 10-2014-7027734.
Office Action dated Sep. 14, 2016 in U.S. Appl. No. 12/198,421, by Johnson.
Examination Report dated Jun. 22, 2016 in EP Application No. 13776685.3.
Office Action dated Jul. 21, 2016 in U.S. Appl. No. 13/829,951, by Johnson.
Office Action dated Jul. 27, 2016 in U.S. Appl. No. 13/829,525, by Johnson.

(56) References Cited

OTHER PUBLICATIONS

Office Action dated Aug. 22, 2016 in JP Application No. 2014-560097.
Office Action dated Jul. 5, 2016 in CN Application No. 201380052635.X.
Office Action dated Jun. 2, 2016 in CN Application No. 201380052598.2.
Office Action dated Jul. 15, 2016 in KR Application No. 10-2014-7027734.
Office Action dated Nov. 18, 2016 in U.S. Appl. No. 13/829,951, by Johnson.
Examination Report dated Nov. 30, 2016 in EP Application No. 13776685.3.
Chen et al., High Capacity and Cyclic Performance in a Three-Dimensional Composite Electrode Filled with Inorganic Solid Electrolyte. Journal of Power Sources, vol. 249, pp. 306-310 (2014).
Office Action dated Jan. 18, 2017 in U.S. Appl. No. 13/829,525 by Johnson.
Office Action dated Nov. 18, 2016 in CN Application No. 201380023413.5.
Office Action dated Feb. 20, 2017 in JP Application No. 2014-560097.
Office Action dated Jan. 17, 2017 in CN Application No. 201380052635.
Extended European Search Report dated Feb. 8, 2017 in EP Application 16202541.
Extended European Search Report dated Mar. 16, 2017 in EP Application No. 17150717.
Int'l Search Report dated Feb. 17, 2017 in Int'l Application No. PCT/US2016/068105.
Okumura et al., "All-Solid-State Lithium-Ion Battery Using Li2.2C0.8B0.2O3 Electrolyte", Solid State Ionic, vol. 288, pp. 248-252 (2016).
"All-Solid-State Lithium-Ion Battery Using Li2.2C0.8B0.2O3 Electrolyte" External Program 20th Century International Conferencer, Presented on Poster Board, 2 pgs (Jun. 15, 2015).
Shannon et al., "New Li Solid Electrolytes", Electro, vol. 22, No. 7, pp. 783-796 (Jul. 1977).
Office Action dated Feb. 15, 2017 in CN Application No. 201380052598.2.
Int'l Search Report dated Apr. 12, 2017 in Int'l Application No. PCT/US2016/068105 (Complete).
Office Action dated Aug. 31, 2015 in KR Application No. 10-2014-7027734.
Office Action dated Aug. 11, 2017 in CN Application No. 2013800234135.
Office Action dated Jul. 20, 2017 in CN Application No. 201380052635.X.
Glass et al, "Ionic Conductivity of Quenched Alkali Niobate and Tantalate Glasses," Journal of Applied Physics, vol. 49, No. 9, pp. 4808-4811 (1978).
Sanchez et al, "Chemical Modification of Alkoxide Precursors," Journal of Non-Crystalline Solids, vol. 100, pp. 65-76 (1988).
Tan et al, "Garnet-type Li7La3Zr2O12 Electrolyte Prepared by a Solution-Based Technique for Lithium ion battery," Mater. Res. Soc. Symp. Proc., vol. 1440 (2012).
Office Action dated Jan. 7, 2013 in U.S. Appl. No. 12/198,421 by Johnson.
Zhang et al, "Study on Synthesis and Evolution of Sodium Potassium Niobate Ceramic Powders by an Oxalic Acid-Based Sol-Gel Method," Journal of Sol-Gel Science and Technology, vol. 57, pp. 31-35 (2011).
Int'l Preliminary Report on Patentability dated Feb. 14, 2013 in Int'l Application No. PCT/US2011/046289.
Jin et al, "All-Solid-State Rechargeable Lithium Ion Battery Fabrication with Al-Doped Li7La3Zr2O12 Solid Electrolyte," Retrieved from <http://international.dep.anl.gov/Postdocs/Symposium/Program/Presentations/32.pdf>, Download date: Oct. 8, 2012, original posting date: unknown, 1 page.
Davison et al, "Low Cost, Novel Methods for Fabricating All-Solid-State Lithium Ion Batteries," downloaded from web page: <http://www.wpi.edu/Pubs/E-project/Available/E-project-042312-141301/unrestricted/SS_Lithium_Ion_Battery_MQP_Final_Report.pdf>, Download date: Apr. 23, 2012, original posting date unknown, 126 pages.
Office Action dated Apr. 29, 2014 in U.S. Appl. No. 12/848,991 by Babic.
Thangadurai et al, "Investigations on Electrical Conductivity and Chemical Compatibility Between Fast Llithium Ion Conducting Garnet-Life Li6BaLa2Ta2O12 and Lithium Battery Cathodes," Journal of Power Sources, vol. 142, pp. 339-344 (2005).
Office Action dated May 1, 2014 in U.S. Appl. No. 13/410,895, by Babic.
Brenier, "Stress and Moisture-Sorption in Ozone-Annealed Films of Zirconium Oxide Obtained from Sol-Gel," Journal of Sol-Gel Science and Technology, vol. 25, pp. 57-63 (2002).
Kreiter et al, "Sol-gel Routes for Microporous Zirconia and Titania Membranes," J. Sol-Gel Sci. Technol., vol. 48, pp. 203-211 (2008).
Office Action dated Jan. 2, 2015 in U.S. Appl. No. 12/198,421 by Johnson.
Boyle et al, "All-Ceramic Thin Film Battery," Sandia Report 2002-3615 Unlimited Release, 53 pgs (Nov. 2002).
Chi-Lin Li et al, "Physical and electrochemical characterization of amorphous lithium lanthanum titanate solid electrolyte thin-film fabricated by e-beam evaporation," Thin Solid Films, vol. 515, pp. 1886-1892 (2006).
Kobayashi et al, "All-Solid-State Lithium Secondary Battery with Ceramic/Polymer Composite Electrolyte," Solid State Ionics, vol. 152-153, pp. 137-142 (2002).
Scanlon, "Lithium Polymer Battery, Final Report for Dec. 8, 1994-Dec. 30, 2002," Energy Storage and Thermal Sciences Branch, Air Force Research Laboratory (2003).
Office Action dated Jun. 26, 2015 in U.S. Appl. No. 14/530,171 by Babic.
Int'l Search Report and Written Opinion dated Apr. 23, 2014 in Int'l Application No. PCT/US2013/063161.
Int'l Search Report and Written Opinion dated Mar. 25, 2014 in Int'l Application No. PCT/US2013/063160.
Boyd, "Thin Film Growth by Pulsed Laser Deposition," Ceramics International, vol. 22, pp. 429-434 (1996).
Office Action dated Jun. 19, 2014 in U.S. Appl. No. 13/829,951 by Johnson.
Office Action dated Dec. 6, 2013 in U.S. Appl. No. 12/848,991 by Babic.
Tan et al, "Fabrication and Characterization of Li7La3Zr2O12 Thin Films for Lithium Ion Battery," ECS Solid State Letters, vol. 1, No. 6, pp. 057-060 (2012).
Ohta et al, "All-solid-state lithium ion battery using garnet-type oxide and Li3BO3 solid electrolytes fabricated by screen-printing," Journal of Power Sources (2013).
Raskovalov et al, "Structure and transport properties of Li7La3Zr2-0.75xAlxO2 superionic solid electrolytes," Journal of Power Sources (2013).
Kotobuki et al, "Fabrication of All-Solid-State lithium battery using novel garnet type electrolyte," ECS Meeting Abstracts (2010).
Mateishina et al, "Solid-State Electrochemical Lithium Cells with Oxide Electrodes and Composite Solid Electrolyte," Russian Journal of Electrochemistry, vol. 43, No. 5, pp. 606-608 (2007).
Wolfenstine, "Grain Boundary Conductivity in Crystalline LiTi2(PO4)3," Army Research Laboratory (Apr. 2008).
Jinlian et al, "Enhanced high temperature performance of LiMn2O4 coated with Li3BO3 solid electrolyte," Bull. Mater. Sci., vol. 36, No. 4, pp. 687-691 (2013).
Balkanski et al, "Inegrable lithium solid-state microbatteries," Journal of Power Sources, vol. 26, pp. 615-622 (1989).
Wu et al, "Sol-gel preparation and characterization of Li1.3Al0.3Ti1.7(PO4)3 sintered with flux of LiBO2," Rare Metals, vol. 29, No. 5, p. 515 (2010).
Allen et al, "Effect of substitution (Ta, Al, Ga) on the conductivity of Li7La3Zr2O12," Journal of Power Sources, vol. 206, pp. 315-319 (2012).

(56) References Cited

OTHER PUBLICATIONS

Aaltonen et al, "Lithium Lanthanum Titanate Thin Films Grown by Atomic Layer Depostion fo rAll-Solid-State Lithium Ion Battery Applications," Abstract #688, The 15th International Meeting on Lithium Batteries (2010).
Birke et al, "A first approach to a monolithic all solid state inorganic lithium battery," Solid State Ionics, vol. 118, pp. 149-157 (1999).
Babic, "A Novel Li Conducting Solid State Electrolyte by Sol Gel Technique" (undated).
Cao et al, "Microstructure and Ionic Conductivit of Sb-doped Li7La3Zr2O12," Journal of Inorganic Materials,vol. 29, No. 2, pp. 220-224 (2014).
Buschmann et al, "Structure and dynamics of the fast lithium ion conductor Li7La3Zr2O12," Physical Chemistry Chemical Physics, vol. 43 (2011).
Chen et al, "Improving ionic conductivity of Li0.35La0.55TiO3 ceramics by introducing Li7La3Zr2O12 sol into the precursor powder," Solid State Ionics, vol. 235, pp. 8-13 (2013).
Chabal et al, "Safer High-performance Electrodes, Solid Electrolytes, and Interface Reactions for Lithium-Ion Batteries," Material Matters, vol. 8, No. 4, pp. 104-110 (2013).
Jin et al, "Al-doped Li7La3Zr2O12 synthesized by a polymerized complex method," Journal of Power Sources, vol. 196, pp. 8683-8687 (2011).
Jin et al, "Bulk solid state rechargeable lithium ion battery fabrication with Al-doped Li7La3Zr2O12 electrolyte and Cu0.1V2O5 cathode," Electrochimica Acta, vol. 89, pp. 407-412 (2013).
Mei et al, "Role of amorphous boundary layer in enhancing ionic conductivity of lithium-lanthanum-titanate electrolyte," Electrochimica Acta, vol. 55, pp. 2958-2963 (2010).
Munshi, "Handbook of Solid State Batteries & Capacitors," World Scientific, Chapters 10-12 (1995).
Rowsell et al, "A new class of materials for lithium-ion batteries: iron(III) borates," Journal of Power Sources, vol. 98-98, pp. 254-257 (2001).
Sakamoto, "Lithium Batteries," Michigan State University (2011).
Tan et al, "Synthesis of Cubic Phase Li7La3Zr2O12 Electrolyte for Solid-State Lithium-Ion Batteries," Electrochemical and Solid-State Letters, vol. 15, No. 3, pp. A37-A39 (2012).
Tadnaga et al, "Low temperature synthesis of highly ion conductive Li7La3Zr2O12-Li3BO3 composites," Electrochemistry Communications (Apr. 3, 2013).
Int'l Search Report and Written Opinion dated Aug. 15, 2013 in Int'l Application No. PCT/US2013/028672.
Nagata et al, "All solid battery with phosphate compounds made through sintering process," Journal of Power Sources, vol. 174, pp. 832-837 (2007).
Sun et al, "High-strength all-solid lithium ion electrodes based on Li4Ti5O12," Journal of Power Sources, vol. 196, pp. 6507-6511 (2011).
Machida et al, "All-Solid-State Lithium Battery with LiCo0.3Ni0.7O2 Fine Powder as Cathode Materials with an Amorphous Sulfide Electrolyte," Journal of the Electrochemical Society, vol. 149, No. 6, pp. A688-A693 (2002).
Lee et al, "The production of LiCoO2 cathode thick films for an all-solid-state microbattery," Journal of Ceramic Processing Research, vol. 8, No. 2, pp. 106-109 (2007).
Kotobuki et al, "Fabrication of Three-Dimensional Battery Using Ceramic Electrolyte with Honeycomb Structure by Sol-Gel Process," Journal of the Electrochemical Society, vol. 157, No. 4, pp. A493-A498 (2010).
Aruna et al, "Combustion synthesis and nanomaterials," Current Opinion in Solid State and Materials Science, Vo. 12, pp. 44-50 (2008).
Kim et al, "Characterization of the interface between LiCoO2 and Li7La3Zr2O12 in an all-solid-state rechargeable lithium battery," Journal of Power Sources, vol. 196, pp. 764-767 (2011).
Oh et al, "Ionomer Binders Can Improve Discharge Rate Capability in Lithium-Ion Battery Cathodes," Journal of the Electrochemical Society, vol. 158, No. 2, pp. A207-A213 (2011).

Int'l Search Report and Written Opinion dated Aug. 22, 2013 in Int'l Application No. PCT/US2013/028633.
Int'l Preliminary Report on Patentability dated Sep. 12, 2014 in Int'l Application No. PCT/US2013/028633.
Bates et al., "Rechargeable Thin-Film Lithium Batteries," Oak Ridge National Laboratory Publication, 9 pgs (1993).
Inaguma et al., "High Ionic Conductivity in Lithium Lanthanum Titanate," Solid State Communications, vol. 86, No. 10, pp. 689-693 (1993).
Bohnke et al., "Mechanism of Ionic Conduction and Electrochemical Intercalation of Lithium into the Perovskite Lanthanum Lithium Titanate," Solid State Ionics, vol. 91, pp. 21-31 (1996).
Birke et al, "Electrolytic Stability Limit and Rapid Lithium Insertion in the Fast-Ion-Conducting Li0.29La0.57TiO3 Perovskite-Type Compound," Journal of the Electrochemical Society, vol. 144, No. 6, pp. L167-L169 (1997).
Stramare et al, "Lithium Lanthanum Titanates: A Review," Chemistry of Materials, vol. 15, pp. 3974-3990 (2003).
Yang et al, "Ionic to Mixed Ionic/Electronic Conduction Transition of Chemically Lithiated Li0.33La0.56TiO3 at Room Temperature: Lithium-ion-Motion Dependent Electron Hopping," Applied Physics Letters, vol. 89, pp. 1-3 (2006).
Ahn et al, "Characteristics of Perovskite (Li0.5La0.5)TiO3 Solid Electrolyte Thin Films Grown by Pulsed Laser Deposition for Rechargeable Lithium Microbattery," Electrochimica Acta, vol. 50, pp. 371-374 (2004).
Furusawa et al, "Ionic Conductivity of Amorphous Lithium Lanthanum Titanate Thin Film," Solid State Ionics, vol. 176, pp. 553-558 (2005).
Ahn et al, "Characteristics of Amorphous Lithium Lanthanum Titanate Electrolyte Thin Films Grown by PLD for Use in Rechargeable Lithium Microbatteries," Electrochemical and Solid-State Letters, vol. 8, No. 2, pp. A75-A78 (2005).
Kitaoka et al, "Preparation of La0.5Li0.5TiO3 Perovskite Thin Films by the Sol-Gel Method," Journal of Materials Science, vol. 32, pp. 2063-2070 (1997).
Jena et al, "Studies on the Ionic Transport and Structural Investigations of La0.5Li0.5TiO3 Perovskite Synthesized by Wet Chemical Methods and the Effect of Ce, Zr Substitution at Ti site," Journal of Materials Science, vol. 40, pp. 4737-4748 (2005).
Popovici et al, "Sol-gel Preparation and Characterization of Perovskite Lanthanum Lithium Titanate," Journal of Materials Science, vol. 42, pp. 3373-3377 (2007).
Office Action dated Jul. 13, 2011 in U.S. Appl. No. 12/163,044 by Johnson.
Brinker et al, "Sol-Gel Science: The Physics and Chemistry of Sol-Gel Processing," Academic Press, pp. 21, 95, 453, 513, 675, 742, 787, and 837 (1990).
Cussen, "Structure and Ionic Conductivity in Lithium Garnets," Journal of Materials Chemistry, vol. 20, pp. 5167-5173 (2010).
Laughlin et al, "Using Sol-Gel Chemistry to Synthesize a Material with Properties Suited for Chemical Sensing," Journal of Chemical Education, vol. 77, No. 1, pp. 77-78 (2000).
Geiger et al, "Crystal Chemistry and Stability of 'Li7La3Zr2O12' Garnet: A Fast Lithium-Ion Conductor," Inorganic Chemistry, vol. 50, pp. 1089-1097 (2011).
Murugan et al, "Fast Lithium Ion Conduction in Garnet-Type Li7La3Zr2O12," Angewandte Chemie International Edition, vol. 46, pp. 7778-7781 (2007).
Peters et al, "Ionic Conductivity and Activation Energy for Oxygen Ion Transport in Superlattices—The Multilayer System CsZ (ZrO2 + CaO) / Al2O3," Solid State Ionics, vol. 178, Nos. 1-2, pp. 67-76 (2007).
Awaka et al, "Synthesis and Structure Analysis of Tetragonal Li7La3Zr2O12 with the Garnet-Related Type Structure," Journal of Solid State Chemistry, vol. 182, No. 8, pp. 2046-2052 (2009).
Gao et al, "Sol-gel Synthesis and Electrical Properties of Li5La3Ta2O12 Lithium Ionic Conductors," Solid State Ionics, vol. 181, Nos. 1-2, pp. 33-36 (2009).
Kishida et al, "Microstructure of the LiCoO2 (cathode)/La2/3-xLi3xTiO3 (electrolyte) Interface and its Influences on the Electrochemical Properties," Acta Materialia, vol. 55, No. 14, pp. 4713-4722 (2007).

(56) References Cited

OTHER PUBLICATIONS

Int'l Search Report and Written Opinion dated Jan. 6, 2012 in Int'l Application No. PCT/US2011/046289.
Drabold, "Topics in the Theory of Amorphous Materials," The European Physical Journal B, vol. 68, pp. 1-21 (2009).
Billinge, "The Nanostructure Problem," Physics, vol. 3, No. 25, pp. 1-3 (2010).
Goodenough et al, "Challenges for Rechargeable Li Batteries," Chemistry of Materials, vol. 22, No. 3, pp. 587-603 (2010).
Owen, "Rechargeable Lithium Batteries," Chemical Society Reviews, vol. 26, pp. 259-267 (1997).
Song et al, "Review of Gel-Type Polymer Electrolytes for Lithium-ion Batteries," Journal of Power Sources, vol. 77, pp. 183-197 (1999).
Li et al, "Synthesis and Characterization of Li ion Conducting La2/3-xLi3xTiO3 by a Polymerizable Complex Method," Ceramics International, vol. 33, pp. 1591-1595 (2007).
Vijayakumar et al, "Synthesis of Fine Powders of Li3xLa2/3-xTiO3 Perovskite by a Polymerizable Precursor Method," Chemistry of Materials, vol. 16, No. 14, pp. 2719-2724 (2004).
Pham et al, "Synthesis and Characterization of Nanostructured Fast Ionic Conductor Li0.30La0.56TiO3," Chemistry of Materials, vol. 18, No. 18, pp. 4385-4392 (2006).
Allnatt et al, "Atomic Transport in Solids," Cambridge University Press, pp. ix-xiii (2003).
Elliott, "Physics of Amorphous Materials," Longman Scientific & Technical, Ed. 2, pp. v-vi (1990).
Zallen, "The Physics of Amorphous Solids," Wiley-VCH, Ed. 1, pp. ix-xi (1983).
Huggins, "Advanced Batteries: Materials Science Aspects," Springer, Ed. 1, pp. xvii-xxx, 368-371 (2008).
West, "Basic Solid State Chemistry," John Wiley & Sons Ltd., Ed. 2, pp. vii-xv, 346-351 (1999).
Ahn et al, "Effect of Li0.5La0.5TiO3 Solid Electrolyte Films on Electrochemical Properties of LiCoO2 Thin Film Cathodes with Different Rapid-Thermal Annealing Conditions," Journal of Vacuum Science & Technology B, vol. 23, No. 5, pp. 2089-2094 (2005).
Xiong et al, "Effects of Annealing Temperature on Structure and Opt-Electric Properties of Ion-Conducting LLTO Thin Films Prepared by RF Magnetron Sputtering," Journal of Alloys and Compounds, vol. 509, pp. 1910-1914 (2011).
Maqueda et al, "Structural, Microstructural and Transport Properties Study of Lanthanum Lithium Titanium Perovskite Thin Films Grown by Pulsed Laser Deposition," Thin Solid Films, vol. 516, pp. 1651-1655 (2008).
Li et al, "Physical and Electrochemical Characterization of Amorphous Lithium Lanthanum Titanate Solid Electrolyte Thin-Film Fabricated by e-beam Evaportation," Thin Solid Films, vol. 515, pp. 1886-1892 (2006).
Office Action dated Jan. 24, 2012 in U.S. Appl. No. 12/198,421 by Johnson.
Kotobuki et al, "Compatibility of Li7La3Zr2O12 Solid Electrolyte to All-Solid-State Battery Using Li Metal Anode," Journal of the Electrochemical Society, vol. 157, No. 10, pp. A1076-A1079 (2010).
Xu, "Nonaqueous Liquid Electrolytes for Lithium-Based Rechargeable Batteries," Chemical Reviews, vol. 104, pp. 4303-4417 (2004).
Ramzy et al, "Tailor-Made Development of Fast Li Ion Conducting Garnet-Like Solid Electrolytes," Applied Materials & Interfaces, vol. 2, No. 2, pp. 385-390 (2010).
Kokal et al, "Sol-gel Synthesis and Lithium Ion Conductivity of Li7La3Zr2O12 with a Garnet-Related Type Structure," Solid State Ionics, vol. 185, pp. 42-46 (2011).
Nimisha et al, "Chemical and Microstructural Modifications in LiPON Thin Films Exposed to Atmospheric Humidity," Solid State Ionics, vol. 185, pp. 47-51 (2011).
Meda et al, "Lipon Thin Films Grown by Plasma-Enhanced Metalorganic Chemical Vapor Deposition in a N2-H2-Ar Gas Mixture," Thin Solid Films, vol. 520, pp. 1799-1803 (2012).
Hämäläinen et al, "Lithium Phosphate Thin Films Grown by Atomic Layer Deposition," Journal of the Electrochemical Society, vol. 159, No. 3, pp. A259-A263 (2012).
Office Action dated May 19, 2017 in U.S. Appl. No. 12/198,421, by Johnson.
Office Action dated Jun. 15, 2017 in U.S. Appl. No. 14/382,191, by Thokchom.
Office Action dated Jun. 13, 2017 in JP Application No. 2015-535773.
Office Action dated May 30, 2017 in JP Application No. 2015-535772.
Office Action dated Aug. 7, 2017 in U.S. Appl. No. 13/829,525, by Johnson.
Yu et al, "A Stable Thin-Film Lithium Electrolyte: Lithium Phosphorus Oxynitride," J. Electrochem. Soc., vol. 144, No. 2, pp. 524-532 (1997).
Zhang et al, "Effect of lithium borate addition on the physical and electrochemical properties of the lithium ion conductor Li3.4Si0.4P0.6O4," Solid State Ionics, vol. 231, pp. 109-115 (2013).
Jin, "Processing and characterization of secondary solid-state Li-Ion batteries," Dissertation submitted to the University of Notre Dame (Apr. 2013).
Tan, "Materials for energy storage in Lithium-Ion batteries," Dissertation submitted to the University of Utah (Dec. 2012).
Office Action dated Jan. 15, 2015 in U.S. Appl. No. 13/829,951 by Johnson.
Written Opinion dated Sep. 22, 2014 in Int'l Application No. PCT/US2013/063161.
Office Action dated May 4, 2015 in U.S. Appl. No. 13/829,951 by Johnson.
Office Action dated Apr. 9, 2015 in U.S. Appl. No. 13/829,525 by Johnson.
Office Action dated Jul. 1, 2015 in U.S. Appl. No. 13/829,525 by Johnson.
Office Action dated Feb. 10, 2016 in U.S. Appl. No. 13/829,525 by Johnson.
"Lithium Batteries," The Sakamoto Group (2011).
Liu et al. "Enhanced high temperature performance of LiMn2O4 coated with Li3BO3 solid electrolyte," Bull. Mater. Sci., vol. 36, No. 4, pp. 687-691 (2013).
Sulaiman, "Fabrication and Characterization of LiNO3—Al2O3 Composite Solid Electrolytes," 2013 3rd International Conference on Chemistry and Chemical Engineering, vol. 38, pp. 1-5 (2012).
Office Action dated Sep. 8, 2015 in U.S. Appl. No. 12/198,421 by Johnson.
Office Action dated Sep. 4, 2015 in EP Application No. 13776685.3.
Office Action dated Jan. 22, 2016 in EP Application No. 13776685.3.
Int'l Preliminary Report on Patentability dated Dec. 22, 2014 in Int'l Application No. PCT/US2013/063161.
Int'l Preliminary Report on Patentabililty dated Apr. 23, 2015 in Int'l Application No. PCT/US2013/063160.
Office Action dated Jan. 16, 2018 in JP Application No. 2015-535773.
Office Action dated Mar. 14, 2018 in U.S. Appl. No. 13/829,525, by Johnson.
Office Action dated Jan. 25, 2018 in CN Application No. 201380052598.2.
Office Action dated Mar. 30, 2018 in CN Application No. 201380023413.5.
Office Action dated Apr. 19, 2018 EP Application No. 16202541.5.
Int'l Preliminary Examination Report on Patentability dated Jul. 5, 2018 in Int'l Application No. PCT/US2016/068105.
Office Action dated Sep. 3, 2018 in CN Application No. 201380052598.2.
Kanamura et al., "Three Dimensionally ordered composite solid materials for all solid-state rechargeable lithium batteries" Journal of Power Sources, 146, pp. 86-89, 2005.
Li et al., Physical and electrochemical characterization of amorphous lithium lanthanum titanate solid electrolyte thin-film fabricated by e-beam evaporation Thin Solid Films, 515, pp. 1886-1892, 2006.

(56) References Cited

OTHER PUBLICATIONS

Office Action dated Dec. 13, 2018 in CN Application No. 2013800234135.

* cited by examiner

The Nyquist plot of impedance spectrum of a typical composite seperator sample prepared from amorphous LLZO and aluminum oxide powder.

HIGH CAPACITY SOLID STATE COMPOSITE CATHODE, SOLID STATE COMPOSITE SEPARATOR, SOLID-STATE RECHARGEABLE LITHIUM BATTERY AND METHODS OF MAKING SAME

CROSS-REFERENCE TO RELATED APPLICATION

This application is a Section 371 U.S. National-Stage Application of International Application No. PCT/US2013/028672, filed Mar. 1, 2013, which was published on Sep. 6, 2013, under International Publication No. WO 2013/131005, and which derives priority from U.S. Patent Application No. 61/605,241, filed Mar. 1, 2012 and U.S. Patent Application No. 61/606,840 filed Mar. 5, 2012, the disclosures of which are all incorporated herein by reference in their entireties.

BACKGROUND OF THE INVENTION

A battery cell is a particularly useful article that provides stored electrical energy which can be used to energize a multitude of devices, including portable devices that require an electrical power source. A battery cell, which is often referred to, somewhat inaccurately, in an abbreviated form as a "battery," is an electrochemical apparatus typically formed from at least one electrolyte (also referred to as an "electrolytic conductor") disposed between a pair of spaced apart electrodes. The electrodes and electrolyte are the reactants for an electrochemical reaction that causes an electric current to flow between the electrodes when respective current collectors in contact with the electrodes are connected to an external circuit containing an object or device (generally referred to as the "load") to be powered. The flow of electrons through the free ends of the electrodes is accompanied and caused by the creation and flow of ions in and through the electrolyte.

Typically, battery performance is enhanced by improving upon one or more of the individual components, such as the electrodes and/or electrolyte, and/or improving the interaction between or among the components of the battery. Materials that serve as electrolytes may have several different forms. For example, an electrolyte material may be a liquid, a solid, or a material such as a paste that has characteristics of both a liquid and a solid. In addition to electrodes and electrolyte, batteries may also contain a separator component, which separates the electrodes from one another. Separation of the electrodes prevents the undesirable conduction of electrons directly between the electrodes, called short circuiting. Typically, some type of solid material that is capable of creating and maintaining physical spacing between electrodes is used as a separator.

In recent years, much consideration has been given to so-called "solid-state" batteries, in which no liquids are employed in the electrodes or electrolyte. In solid-state batteries, the functions of separating electrodes (separator function) and of serving as a medium for the conduction of ions between electrodes (electrolyte function) are carried out by a single component. Thus, a solid ionically conductive electrolyte often serves as both a separator and as an electrolytic conductor. Very recently, solid ionically conductive materials, such as ionically conductive metal oxides, and amorphous ionically conductive metal oxides in particular, have been investigated for use as solid electrolytes in solid-state batteries. However, some solid ionically conductive materials have flaws, such as cracks in the material, which may adversely impact battery performance. Solid ionically conductive materials are often produced from precursors via a process that may cause cracks to be formed in the final product. Such cracks may inhibit the optimum transport of ions through the solid electrolyte. In addition, cracks may provide pathways for the transport of electrons between electrodes, thereby producing short-circuits that may cause the cell to fail. Thus, it can be appreciated that it would be useful to develop a solid ionically conductive electrolyte, suitable for use in solid-state batteries, in which flaws are sufficiently diminished or eliminated and cell performance is enhanced.

Thin film sputtered cathode materials are currently being used in state of the art thin film solid-state lithium and lithium ion batteries. Because lithium atoms generally have low diffusion coefficients in active cathode materials, the capacity of thick layer cathodes can only be shallowly, not fully, accessed during charge/discharge cycles of the battery. As a result, lithium ions can only move a limited distance from their entrance point into the cathode material at reasonable charge discharge rates. This shallow access dramatically reduces the volumetric and gravimetric energy density of the resulting batteries.

Current thin film solid-state lithium-ion battery technology employs expensive substrates, including noble metals, and uses expensive sputtering processes to form the cathode material coatings. Despite high cost, high temperature-stable noble metals, such as gold, are utilized to retain the electronic conductivity of the current collectors required in such cells under the high temperature (>850° C.) procedures used to crystallize films and/or layers of the cathode materials.

Accordingly, cost effective solid-state lithium batteries containing high capacity cathodes are highly desirable.

BRIEF SUMMARY OF THE INVENTION

A solid state composite cathode according to an embodiment of the invention comprises an active cathode material dispersed in an amorphous inorganic ionically conductive metal oxide.

A method of producing a solid state composite cathode according to an embodiment of the invention comprises:

(a) preparing a slurry comprising an active cathode material and precursors for an amorphous inorganic ionically conductive metal oxide;

(b) forming a film from the slurry; and (c) heating the film to form the amorphous inorganic ionically conductive metal oxide, wherein the active cathode material is dispersed in the amorphous inorganic ionically conductive metal oxide.

A solid composite separator according to an embodiment of the invention comprises an inorganic electronically insulating powder dispersed in an amorphous, inorganic, ionically conductive metal oxide.

A method of producing a solid composite separator according to an embodiment of the invention comprises (a) preparing a slurry comprising an inorganic electronically insulating powder and precursors for an amorphous inorganic ionically conductive metal oxide;

(b) forming a film from the slurry; and (c) heating the film to form the amorphous inorganic ionically conductive metal oxide, wherein the inorganic electronically insulating powder is dispersed in the amorphous inorganic ionically conductive metal oxide.

A solid state composite electrode according to another embodiment of the invention comprises an active electrode material dispersed in an amorphous inorganic ionically conductive metal oxide.

Finally, a method of producing a solid state composite electrode according to an embodiment of the invention comprises:

(a) preparing a slurry comprising an active electrode material and precursors for an amorphous inorganic ionically conductive metal oxide;

(b) forming a film from the slurry; and (c) heating the film to form the amorphous inorganic ionically conductive metal oxide, wherein the active electrode material is dispersed in the amorphous inorganic ionically conductive metal oxide.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawing embodiments which are presently preferred. It should be understood, however, that the invention is not limited to the precise arrangements and instrumentalities shown.

In the drawings.

DETAILED DESCRIPTION OF THE INVENTION

The invention is directed to a high capacity solid state composite cathode, a high capacity solid-state rechargeable lithium battery containing the cathode, and methods for their manufacture. The invention is also directed to a composite solid separator or electrolyte containing a solid ionically conductive material, a high capacity solid state rechargeable lithium battery containing the separator, and methods for their manufacture. The term "battery" technically refers to a combination of two or more cells, but is commonly used to refer to a single cell. Accordingly, for the purposes of this disclosure, the term "battery" refers to both a single cell and a battery containing multiple cells.

The hereby disclosed invention and process apply particularly to oxide electrodes in lithium and lithium ion batteries which are mostly applied as cathodes, although there are examples of oxide anodes, such as lithium titanium oxide (LTO). Thus, for the purposes of this disclosure, the term "cathode" may be understood to refer not only to a cathode per se, but also to any active oxide electrode, even if it is used as an anode in a battery due to its low voltage. Additionally, although lithium batteries contain an anode made of pure lithium and lithium ion batteries contain an anode made of lithium-containing material, the terms "lithium battery" and "lithium ion battery" are used interchangeably in this disclosure.

Solid State Composite Cathode

The high capacity solid state composite cathode according to the invention comprises a an active cathode material dispersed in an amorphous inorganic ionically conductive metal oxide. The active cathode material (powder), such as, for example, $LiCoO_2$ or $LiNi_{0.33}Co_{0.33}Mn_{0.33}O_2$ (NCM), has preferably been treated to remove passivating surface impurities or coatings (films). Preferred amorphous inorganic ionically conductive materials include lithium lanthanum zirconium oxide (LLZO) and/or amorphous lithium carbon lanthanum zirconium oxide (LCLZO). Optionally, the cathode further comprises an electronically conductive material, such as carbon black or carbon nanotubes, dispersed in the amorphous inorganic ionically conductive metal oxide. As described in more detail below, the cathode is preferably formed by combining the active cathode material, precursors of the amorphous inorganic ionically conductive metal oxide, and optionally electronically conductive material, to form a slurry, and forming a film from the slurry, such as by casting. A heating and curing process converts the precursors into the amorphous material having the cathode active material dispersed therein.

When used to form a battery, the film may be cast from the slurry as a layer on a thin electronically conductive substrate, such as a metal foil, to serve as the current collector. The amorphous ionically conductive material will then function as both the electrolyte and the binder.

The active cathode material component of the composite cathode structure is prepared from a commercially available active cathode powder, such as $LiCoO_2$ or NCM, commercially available from Pred Materials International (New York, N.Y.). Other oxide active intercalation material powders known in the art or to be developed for use in lithium or lithium ion batteries would also be appropriate. The commercial powder is preferably washed in alcohol (such as isopropanol, for example) and dried by heating at about 200 to 650° C. for about two hours in an oxygen atmosphere, ozone-rich air or air. Such treatment results in a material which is at least substantially free of surface impurities.

It has been found that commercially available cathode powders have reacted with moisture in the air, resulting in the formation of thin passivating layers, such as lithium carbonate, lithium hydroxide, and/or lithium oxide, on the surface of the cathode materials. These thin passivating layers (typically much less than 1 micron in thickness) have high impedance, and act as a barrier to the passage of lithium ions. Accordingly, it has been found that treating commercially available cathode powders to remove the surface impurities results in a superior battery.

The second component of the composite cathode preferably contains amorphous LLZO and/or LCLZO, which provides high ionic conductivity to the cathode and serves as the cathode binder. These materials are described in United States Patent Application Publications Nos. 2011/0053001 and 2012/0196189, the disclosures of which are herein incorporated by reference in their entirety. These application publications are hereinafter referred to as "the '001 application publication" and "the '189 application publication," respectively. For the purposes of this disclosure, the term "LLZO" may be understood to refer to LLZO and/or LCLZO. It is also within the scope of the invention to utilize alternative amorphous inorganic ionically conductive metal oxides instead of or in addition to the LLZO. For example, appropriate amorphous inorganic materials are those in which one or more of the elements in LLZO has been partially or completely replaced by a different element, such as replacing zirconium with tantalum. Such alternative materials are also described in the '001 and '189 application publications and all of the materials described therein are also within the scope of the invention.

The inorganic metal oxide, such as the preferred amorphous LLZO/LCLZO, is preferably combined with the cathode material as precursors, that is, compounds of lanthanum, lithium, and zirconium. Preferably, a precursor solution of such compounds which may be preferably applied by sol gel techniques is employed. For example, appropriate precursor solutions for LLZO and LCLZO are described in detail in the '001 and '189 application publications, the disclosures of which are herein incorporated by reference in their entirety. In a preferred embodiment, the solution of precursors contains a lanthanum alkoxide, a lithium alkoxide, and a zirconium alkoxide dissolved in a solvent, such as an alcohol. Preferred precursors include lithium butoxide, lanthanum methoxyethoxide, and zirconium butoxide, and a preferred solvent is methoxyethanol. These precursor components are exemplary, not limiting, and alternative precursor solutions are also within the scope of the invention, provided that they contain the required lithium, lanthanum, zirconium, and oxygen components in appropriate concentrations. It is also within the scope of the invention to prepare more than one solution, such as three solutions each containing one of the desired lithium, lanthanum, or zirconium compounds. If an amorphous metal oxide other than or in addition to the preferred LLZO/LCLZO is to be contained in the final cathode, the appropriate precursor solution(s) should contain the desired components in appropriate concentrations.

In a preferred embodiment, the composite cathode also contains an electronically conductive material and/or at least one additional ionically conductive material in powder form. Such materials are also combined with the active cathode material and amorphous material precursor and will be dispersed in the amorphous material after casting, for example, and heating (curing). Exemplary electronically conductive materials comprise carbon, preferably commercially available standard acetylene black, carbon nanotubes, or a mixture thereof. The ionically conductive powder may be a single material or a combination of materials. Examples of suitable ionically conductive powders include, but are not limited to, lithium aluminum germanium phosphate (LAGP), lithium aluminum titanium phosphate (LATP), LLZO/LCLZO, or lithium lanthanum titanium oxide (LLTO). Thus, in a preferred embodiment, two forms of LLZO may be used to produce the composite cathode: fully formed LLZO powder (amorphous or crystalline) and a LLZO precursor solution which will become amorphous LLZO after casting and curing.

A preferred composite cathode is formed from a slurry that contains about 3 g of NCM, about 3 ml LLZO sol gel precursor solution (as described in the '001 and '189 application publications), about 0.75 g of LAGP, and about 0.02 g of acetylene black. More generally, the solids portion of the slurry preferably comprises about 80 to 100% cathode powder, about 0 to 30% LAGP, and about 0 to 3% carbon, all percentages being by weight. The ratio of the liquid portion (LLZO sol gel precursor solution) to the solid portion of the slurry is preferably about 75 to 200% (in milliliters) liquid to about 100% (by weight in grams) solids.

The term "slurry" may be understood to encompass materials having a range of viscosity, and may include a damp powder, a thick paste, a thin paste, a free flowing material, a thick liquid, a thin liquid, etc. After combining the active material with a solution containing the precursor compounds, the majority of the solvent may be evaporated to concentrate the slurry into the form of a thicker material, such as a paste. It is also within the scope of the invention to combine the precursor compounds with the active material (and optionally additional components, as previously described) using only a minimal amount of solvent necessary for mixing of the components.

The components of the cathode slurry may be mixed or energy milled in an inert environment to obtain a homogeneous mixture and then formed into a film, such as by casting or calendaring using known techniques. The method of mixing the components is not critical and may be determined or adjusted by routine experimentation. The film, which may also be referred to as a sheet or wafer, may be thick or thin, and may have a thickness of about 1 micron to about 1 mm. When the slurry is in the form of a thick paste or damp powder, for example, the film may also be formed by compacting or pressing it into a rigid or semi-rigid structure, such as a sheet or wafer, using a press or other device which applies pressure.

When preparing a battery, the film may be cast or calendered onto a thin electronically conductive substrate, preferably an inexpensive thin metal foil substrate, as a coating or layer. The substrate, which will serve as a current collector in the battery, preferably has a thickness of about 5 microns to about 50 microns, more preferably about 5 microns to about 30 microns. A preferred substrate is aluminum foil. It is within the scope of the invention to utilize other substrates, including other metal substrates, such as nickel foil, in place of aluminum, provided that they provide the same advantages. Specifically, other flexible foils exhibiting high electronic conductivity, such as metalized non-metal foils, composite foils, and other foils known in the art or to be developed which have similar properties are also within the scope of the invention. Preferably the coating composition is coated on the substrate to form a layer having a thickness of about 5 to 50 microns.

Finally, as described in more detail below, the film (which may be self-supporting or supported on a substrate) is heated (cured) to convert the precursors into the amorphous inorganic ionically conductive metal oxide having the active material (and optional additional components) dispersed therein.

It is also within the scope of the invention to include additional layers in the cathode. For example, multiple layers of cathode composition, such as from the slurry as described above, having a thickness of about 5 to about 50 microns may be applied to the cathode film. Additionally, one or more compacting steps or calendering steps may be performed after application of the materials onto the substrate to facilitate the formation of a smooth surface battery. One or more layers of LLZO (deposited by sol-gel techniques from a precursor solution) may also be applied onto the composite cathode to further increase the ionic conductivity. Advantageously, the cathode according to the invention is formed using only low temperatures processing (up to about 350° C.).

Solid State Battery

A high capacity rechargeable lithium solid state battery according to an embodiment of the invention contains, in addition to the previously described cathode, a thin solid electrolyte, such as amorphous LLZO and/or lithium phosphorus oxynitride (LiPON), and/or a thick solid electrolyte, such as an amorphous LLZO based-composite separator, either of which (or their combination) is deposited onto the previously described cathode, and a lithium-based anode, such as a metal current collector, silicon, lithium, a lithium alloy, or lithium titanium oxide (LTO). Other battery parts well known in the art may also be included, such as current collector(s) and outside casing. If only a metal current collector, such as a copper film, is utilized, the lithium anode will be formed upon initial charging of the battery as lithium is plated between the current collector and the separator. Thus, both lithium and lithium-ion batteries are within the scope of the invention. During synthesis of the battery, processing is performed at low temperatures (up to about 350° C.), which further reduces the cost of the battery.

Additionally, the invention is directed to a solid state lithium or lithium ion battery comprising a composite solid state anode, a cathode, and a separator, in which the composite solid state anode is as described previously. In other words, solid state lithium or lithium ion batteries according to the invention comprises a composite solid state electrode according to the invention, a counter electrode, and a separator.

As previously explained, when forming the batteries according to the invention, the composite electrode may be cast or applied directly onto an electronically conductive substrate serving as a current collector.

Figure 1:
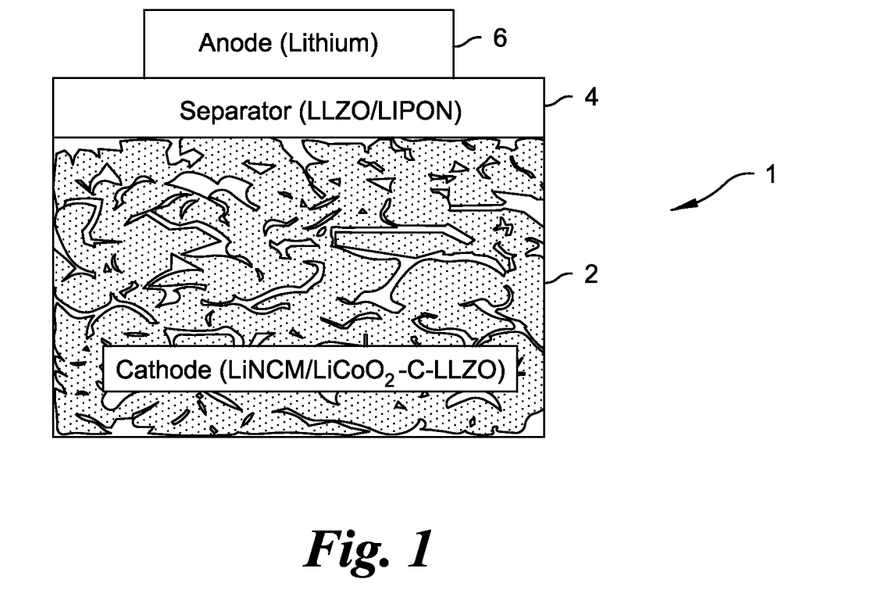
FIG. 1 is a schematic cross sectional diagram of a lithium battery cell according to an embodiment of the invention.

A schematic of an exemplary solid state lithium battery according to an embodiment of the invention is shown in FIG. 1. As shown in FIG. 1, a portion of the lithium battery 1 contains a composite cathode 2 containing cathode powder, LLZO, and optionally carbon, a separator 4, and a lithium-based anode 6.

Figure 2:
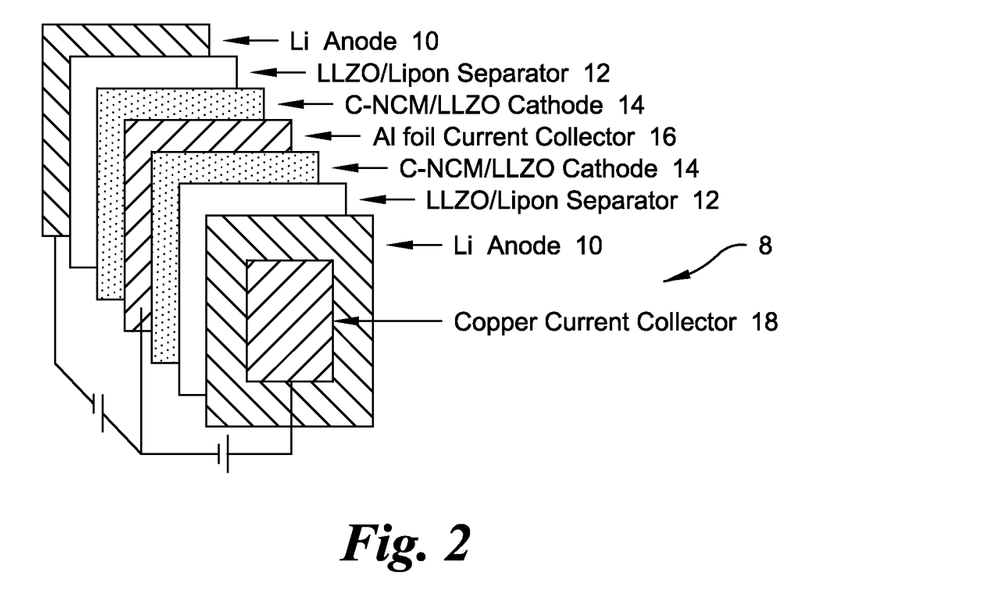
FIG. 2 is a schematic diagram of a complex two battery cell according to an embodiment of the invention.

Also within the scope of the invention are complex two battery cell structures containing a single cathode current collector (thin metal foil substrate) and complete cells constructed on both sides of the substrate, as shown in FIG. 2. As shown in FIG. 2, a lithium battery 8 contains an aluminum foil current collector 16 sandwiched between two composite cathodes 14, two solid state separators 12, and two lithium anodes 10. A copper current collector 18 is present on the external surface of one of the lithium anodes.

Solid state lithium batteries according to the invention exhibit high capacity during cycling by deep harvesting the active cathode material due to the presence of a highly conducting LLZO/LCLZO or analogous network in the cathode structure. In addition to providing an enhanced ion conduction network in the cathode structure to facilitate this deep accessing of the active cathode material, LLZO or analogous material also binds the cathode material, providing structural integrity to the cathode without requiring high temperature sintering or any other high temperature processing step.

The batteries of the invention thus provide numerous advantages relative to prior art batteries, including high capacity, deep access of the cathode, low cost, low temperature processing, smooth surface cathodes (leading to better uniformity and coverage by the solid electrolyte separator film), and the ability to scale up to large size batteries.

Cathode and Battery Preparation

The methods for producing the cathode and battery according to the invention preferably involve at least the following steps, which will be described in more detail below. However, some of these steps, while preferred, are not critical, and other steps may be combined or modified based on routine experimentation. The method steps include:

(1) preparing an active cathode material substantially free from surface impurities;
(2) preparing precursor compounds for an amorphous inorganic ionically conductive metal oxide, such as an LLZO/LCLZO precursor solution;
(3) preparing a slurry containing the active cathode material and the precursor compounds;
(4) forming a film from the slurry;
(5) exposing the film to ozone-rich, low humidity air,
(6) heating the film at about 70 to 130° C. in ozone-rich, low humidity air,
(7) heating the film at about 280 to 350° C. in low humidity air to form a cathode;
(8) depositing a solid electrolyte separator layer on the cathode; and
(9) depositing a lithium-based anode on the electrolyte layer to form the battery.

Importantly, at least steps (4) to (6) are preferably performed in an ozone-rich, low humidity environment. The term "ozone-rich" refers to an environment containing at least about 0.05 ppm ozone and the term "low humidity" describes an environment having less than about 30 percent relative humidity (RH).

(1) Active Cathode Material Preparation

The first step in the method of the invention involves preparing an active cathode material or powder that is preferably substantially free from passivating surface films (surface impurities). The material is prepared from a commercially available cathode powder, such as $LiCoO_2$ or NCM, available from Pred Materials International (New York, N.Y.). Other oxide active intercalation material powders known in the art or to be developed for use in lithium or lithium ion batteries would also be appropriate. The powder is first washed in alcohol (such as isopropanol, for example) and dried by heating at about 200 to 650° C. for about two hours in an oxygen atmosphere, ozone-rich air, or air. The isopropanol washing is preferably performed by placing the cathode active powder in a pan, pouring the alcohol over the powder until all of the powder has been submerged in the liquid, briefly mixing the powder in the liquid, pouring off the excess liquid, and placing the wet powder in a furnace for the heating step.

As previously explained, it has been found that treating commercially available cathode powders to remove the passivating surface impurities, such as lithium carbonate, lithium oxide, and lithium hydroxide, which act as a high impedance barrier, results in a superior battery.

The active intercalation material is preferably NCM or $LiCoO_2$. However, other oxide electrode materials may also be used to form a composite solid state electrode according to the invention. For example, LTO is an oxide intercalation material that is generally considered to be an anode material due to its low voltage. Accordingly, LTO powder may also be used as an active material to form a composite solid state electrode in the same manner as described for the formation of a solid state cathode.

(2) Amorphous Ionically Conductive Material Precursor Solution Preparation

The second step in the method involves preparing precursor compounds for the amorphous inorganic ionically conductive metal oxide, preferably a solution of such precursors. In a preferred embodiment, the step involves preparing a solution of LLZO/LCLZO precursors, namely, compounds containing lanthanum, lithium, and zirconium which may be preferably applied by sol gel techniques. For example, appropriate precursor solutions for LLZO and LCLZO are described in detail in the '001 and '189 application publications. In a preferred embodiment, the solution contains a lanthanum alkoxide, a lithium alkoxide, and a zirconium alkoxide dissolved in a solvent, such as an alcohol. Preferred precursors include lithium butoxide, lanthanum methoxyethoxide, and zirconium butoxide, and a preferred solvent is methoxyethanol. These precursor components are exemplary, not limiting, and alternative precursor solutions for LLZO/LCLZO are also within the scope of the invention, provided that they contain the required lithium, lanthanum, zirconium, and oxygen components in appropriate concentrations. It is also within the scope of the invention to prepare more than one solution, such as three solutions each containing one of the desired lithium, lanthanum, or zirconium components. If an amorphous material other than or in addition to LLZO/LCLZO is to be contained in the final cathode, the appropriate precursor solution(s) should contain the desired components in appropriate concentrations.

The precursor solution may be prepared by mixing the components in any sequence at room temperature. Preferably, the thoroughly-mixed precursor solution is maintained in an inert environment for about one to 1.5 hours to help facilitate substantially complete dissolution of the components. An "inert environment" may be understood to refer to a nitrogen or argon environment in which the moisture is low enough that lithium components are not degraded due to moisture.

(3) Slurry Preparation

After preparing the precursor compounds and active cathode material, the next step in the method involves forming a slurry containing these components. The slurry may be simply prepared by combining appropriate amounts of solution and active material and mixing, such as by energy milling in an airtight jar for about 60 to about 100 minutes, or until the resulting mixture is homogeneous by visible inspection. However, such a method of slurry preparation is by no means limiting and any appropriate method of mixing and slurry preparation is also within the scope of the invention. As previously explained, the slurry is preferably prepared in an inert (nitrogen or argon filled) environment. In a preferred embodiment, no additional solvent is added to form the slurry other than the solvent present in the precursor solution.

Each of the slurry components will play a distinct role in the final cathode. Specifically, the active cathode material intercalates lithium, and the precursors to LLZO/LCLZO or similar material functions as an ionically conductive component and, after curing, as a solid electrolyte and as a binder for the cathode.

In a preferred embodiment, the slurry contains a third component, which provides electronic conductivity to the cathode. This component is a carbon material, such as the preferred commercially available standard acetylene black and/or carbon nanotubes, although other carbon materials which would provide the same function would also be appropriate. It is also within the scope of the invention to include more than one type of electronically conductive material. When carbon is included in the slurry, it may be necessary to add additional solvent in order to facilitate the formation of a homogeneous suspension. The added solvent is preferably the same solvent contained in the precursor solution, such as the preferred methoxyethanol. The amounts of carbon (and optionally solvent) to be added may be determined by routine experimentation in order to maintain the same viscosity of the suspension Additionally, it is also within the scope of the invention to include an additional powder in the slurry to further improve the ionic conductivity. Such additional powders may include, for example, LATP (lithium aluminum titanium phosphate), LAGP (lithium aluminum germanium phosphate), LLZO/LCLZO powder, or another oxide/phosphate based ionically conductive powder. It may be advantageous to replace some of the precursor solution, such as the preferred LLZO/LCLZO precursor solution, with one or more of these powders to increase the ionic conductivity, yield a compact structure, and reduce the drying time needed due to the decrease in the amount of solvent present from the precursor solution. Thus, in a preferred embodiment, LLZO is present in two forms in the cathode slurry: a fully formed LLZO powder (amorphous or crystalline) and a LLZO precursor solution which will become amorphous LLZO after casting and curing.

A preferred slurry contains about 3 g of NCM, about 3 ml LLZO precursor solution (as described in the '001 application publication), about 0.75 g of LAGP and about 0.02 g of acetylene black. More generally, the solids portion of the slurry preferably comprises about 80 to 100% cathode powder, about 0 to 30% LAGP, and about 0 to 3% carbon, all percentages being by weight. The ratio of the liquid portion (LLZO precursor solution) to the solid portion of the slurry is preferably about 75 to 200% (in milliliters) liquid to about 100% (by weight in grams) solids.

The term "slurry" may be understood to encompass materials having a range of viscosity, and may include a damp powder, a thick paste, a thin paste, a free flowing material, a thick liquid, a thin liquid, etc. After combining the active material with a solution containing the precursor compounds, the majority of the solvent may be evaporated to concentrate the slurry into the form of a thicker material, such as a paste. It is also within the scope of the invention to combine the precursor compounds with the active material (and optionally additional components, as previously described) using only a minimal amount of solvent necessary for mixing of the components.

(4) Forming a Film

The next step in the method involves forming a film from the slurry, such as by casting or calendering. The film preferably has a thickness of about 1 micron to about 1 mm.

It is within the scope of the invention to form a film that will be self-supporting and free standing, or to form a film from the slurry on a substrate, preferably a thin, electronically conductive substrate such as the preferred thin aluminum foil substrate, to form a layer or coating. Aluminum has several advantages, including being light weight and inexpensive, in contrast with more expensive metal substrates utilized in traditional batteries. The aluminum foil or other substrate preferably has a thickness of about 5 microns to about 50 microns, more preferably about 5 microns to about 30 microns. It is within the scope of the invention to utilize other substrates, such as other metal and non-metal electronically conductive substrates, including nickel foil, in place of aluminum, as long as they provide the same advantages and can withstand the curing processing temperature and environment. Preferably, the metal foil is cleaned prior to casting, such as by wiping with alcohol.

The casting is preferably performed by tape casting on a standard flat casting table. The method of tape casting is well known in the art and need not be described. Appropriate conditions for the tape casting are known in the art or may be determined by routine experimentation. The casting is preferably performed in an ozone-rich and low humidity environment, as previously described. The slurry may also be applied by other means, such as calendering, using known techniques.

Additionally, if the slurry is relatively viscous, such as a thick paste or damp powder, a film may be formed by compacting the slurry, such as under pressure with a press or other device known in the art, to form a rigid or semi-rigid structure.

(5)-(7) Forming the Cathode

After film forming, the film is preferably exposed to low humidity, ozone-rich air, such as for about one hour, heated at about 70 to 130° C. in ozone-rich, low humidity air, such as for about one hour, and then heated at about 280 to 350° C. in low humidity air, such as for about one hour to form a cathode. More preferably, the first heating step is performed at about 75 to 90° C., more preferably about 80° C., and the second heating step preferably performed at about 300 to about 310° C. The specific drying and heating times and temperatures may be varied, but are preferably performed at no higher than about 350° C. It is also within the scope of the invention to omit the first exposure step and proceed with the two heating steps after casting. After these heating steps, the cathode is now complete.

Importantly, the lower temperature heating is preferably performed in an ozone-rich (containing at least about 0.05 ppm ozone) and low humidity (less than about 30 percent relative humidity) environment, and the higher temperature heating is performed in low humidity air. Without wishing to be bound by theory, it is believed that the lower temperature heating gently evaporates the alcohol components from the precursor solution without destroying the soft and sensitive structure of the solid material. Subsequently, the higher temperature heating step serves to solidify the active material in the amorphous material.

It is also within the scope of the invention to perform additional steps during production of the cathode. For example, after film forming and before heating, in a preferred embodiment, a layer or film of LLZO precursor solution may be spin coated onto the cast film. Upon subsequent heating to about 70 to 130° C. and drying at about 280 to 350° C., this additional LLZO layer helps to improve the ionic conductivity and mechanical integrity of the cathode.

It is also within the scope of the invention to perform a compacting step to compact the film. If compacting is performed, it is preferably performed after the lower temperature heating step but before the higher temperature heating step. It has been found that after heating to about 350° C., an amorphous solid material has been formed, and compacting is not possible without cracking of the material. Compacting may be performed by any method known in the art, such as calendering, and may be performed in an inert or low humidity environment.

If compacting is performed, it is also within the scope of the invention to subsequently spin coat an additional layer of amorphous inorganic ionically conductive metal oxide, such as an LLZO/LCLZO layer (from a precursor solution) onto the cathode, followed by two heating steps as previously described.

Thus, in a preferred embodiment, the method comprises casting forming a film from the slurry, optionally applying a layer of amorphous LLZO/LCLZO from a precursor solution, drying at about 70-130° C., compacting the slurry and LLZO/LCLZO layer, and applying a second layer of LLZO/LCLZO from a sol-gel precursor solution and drying, followed by a final heating step at about 280-350° C.

(8) Depositing Electrolyte Separator Layer

To form a battery, a separator (electrolyte) layer is subsequently deposited onto the completed cathode, more preferably onto a completed cathode/current collector combination. As noted above, the cathode may be formed directly on an electronically conductive substrate, such as a metal foil, which serves as the current collector. Alternatively, the cathode may be formed as a self-supporting, free-standing structure. If so, a current collector may be coated onto the cathode using known techniques.

The specific electrolyte material used for the separator is not critical, and may be one known in the art or to be developed for solid-state batteries. In preferred embodiments, the electrolyte is preferably a layer of lithium phosphorus oxynitride (LiPON), which may be vacuum sputtered to a thickness of about 1.5 to 2 microns, or a layer of LLZO deposited from a sol-gel precursor solution to a thickness of 1-2 microns, exposed to low humidity, ozone-rich air, and heated at about 70-130° C. and then at about 280-350° C. as previously described. The separator may also be the composite separator described in more detail below. Other methods for depositing solid electrolyte separator materials on top of a solid cathode are well known in the art and need not be described.

(9) Depositing Lithium Anode

Finally, a lithium-based anode (preferably about 2 microns in thickness) is deposited on the electrolyte (separator) layer to complete the solid-state battery. The anode may be any anode material known in the art or to be developed, such as a metal current collector, silicon, lithium, a lithium alloy, or lithium titanium oxide (LTO). If only a metal current collector, such as a copper film, is utilized, the lithium anode will be formed upon initial charging of the battery as lithium is plated between the current collector and the separator. Methods for depositing anode materials on top of a solid electrolyte are well known in the art and need not be described.

According to the invention, high capacity solid-state batteries are achieved by deep accessing the cathode material, which is made possible by the presence of a highly ionically conducting network, such as an LLZO/LCLZO network, in the cathode structure. Processing of the cathode at low temperature (about 350° C.), compared with high temperature processed (sintered) cathodes, is enabled by utilizing a highly ionically conductive amorphous material, such as LLZO, as a binder. This low temperature processing helps reduce the cost of solid-state battery manufacturing. The use of inexpensive thin aluminum foil as a substrate in the battery, rather than expensive substrates such as gold, is also possible because of the low temperature processing. Finally, the ability to achieve a smooth cathode surface leads to better uniformity and coverage of the separator film. This method also allows scale up of the size of the battery.

Solid State Composite Separator

The solid state composite separator according to the invention is formed from a composite ionically conductive solid material. Because this ionically conductive solid material is capable of serving as both a separator and an electrolyte, it may be understood that the description of "separator" in this section also refers to an "electrolyte." The ionically conductive material is a composite comprising an inorganic powder dispersed in a binder of amorphous, inorganic, ionically conductive metal oxide, such as LLZO/LCLZO. To form a working battery, the separator is cast onto a cathode, which serves as a substrate for the separator. The presence of the inorganic powder increases the thickness of the layer of amorphous material, thus reducing defects induced by debris which are present in very thin films, and which destroy their functionality as separators. Thus, the presence of the inorganic powder increases the reliability of the amorphous material and provides a better separator material.

Inorganic Powder

A variety of inorganic powders, both amorphous and crystalline, are appropriate for use as the inorganic powder in the invention provided that the powder is an electronic insulator. Preferred powders include LLZO, which is ionically conductive, and aluminum oxide, which is non-conductive.

Other electronically insulating materials may also be used alone or in combination, provided that they bond well with the binder, described below. Exemplary non-conductive inorganic powders include, without limitation, inorganic single metal/multi-metal/non-metal oxides, carbides, phosphates, and nitrides, such as $Al_2O_3$, $TiO_2$, ZnO, $SiO_2$, $BaTiO_3$, $LiAlO_3$, BC, BN, etc. Appropriate particle sizes may be selected based on routine experimentation.

It is also within the scope of the invention to include an ionically-conductive inorganic powder in addition to or instead of the electronically insulating powders described above to enhance the ion-transport capability of the separator. While not required, inclusion of one or more ionically conductive inorganic powders is advantageous and a preferred embodiment of the invention. Exemplary ionically conductive inorganic powders include, for example, crystalline or amorphous LLZO, crystalline or amorphous LCLZO, lithium aluminum titanium phosphate (LATP), lithium aluminum germanium phosphate (LAGP) and lithium lanthanum titanium oxide (LLTO). The inorganic powders listed above are exemplary, not limiting, and it is also within the scope of the invention to utilize other inorganic powder materials that are known in the art or to be developed which would provide the same benefits as the materials described herein. Appropriate particle sizes may be selected based on routine experimentation.

Ionically Conductive Metal Oxide

Presently preferred inorganic, amorphous, ionically conductive metal oxide materials include amorphous LLZO and amorphous LCLZO as previously described, that is, a solution containing precursor compounds. It is also within the scope of the invention to utilize alternative amorphous inorganic ionically conductive materials instead of or in addition to the LLZO. Other preferred materials are also amorphous, oxide-based compounds. For example, appropriate amorphous inorganic materials are those in which one or more of the elements in LLZO has been partially or completely replaced by a different element, such as replacing zirconium with tantalum, provided that the resulting material exhibits the desired properties. Such alternative materials are also described in the '001 and '189 application publications and incorporated by reference herein.

The ionically conductive material is preferably prepared from a sol gel precursor solution containing the desired elements, as previously described. Specifically, the preferred LLZO/LCLZO is preferably prepared from a solution containing compounds of lanthanum, lithium, and zirconium which may be preferably applied by sol gel techniques. For example, appropriate precursor solutions for LLZO and LCLZO are described in detail in the '001 and '189 application publications. In a preferred embodiment, the solution contains a lanthanum alkoxide, a lithium alkoxide, and a zirconium alkoxide dissolved in a solvent, such as an alcohol. Preferred precursors include lithium butoxide, lanthanum methoxyethoxide, and zirconium butoxide, and a preferred solvent is methoxyethanol. These precursor components are exemplary, not limiting, and alternative precursor solutions are also within the scope of the invention, provided that they contain the required lithium, lanthanum, zirconium, and oxygen components in appropriate concentrations. It is also within the scope of the invention to prepare more than one solution, such as three solutions each containing one of the desired lithium, lanthanum, or zirconium components. If an amorphous material other than or in addition to LLZO/LCLZO is to be contained in the final cathode, the appropriate precursor solution(s) should contain the desired components in appropriate concentrations.

Separator and Method of Formation

The separator according to the invention may be formed by any known method for dispersing a powder into primary ingredient(s) or precursor(s) and for producing a substantially solid medium in which the particles of powder will be dispersed. A preferred method for producing the separator involves first creating a slurry by mixing together the inorganic powder with one or more liquid precursor(s) of the amorphous, inorganic ionically conducting material, then forming a film of the slurry. Finally, the film is subjected to a thermal curing process (heating) whereby the precursors are converted into the amorphous ionically conductive material. These steps are described in detail above with respect to the preparation of the composite cathode; differing only in the fact that the electronically insulating inorganic powder is used instead of the cathode active material and optional electronically conductive material.

When LLZO or LCLZO is utilized as the amorphous ionically conductive metal oxide, the drying and curing process preferably involves two sequential heating steps that are performed in specific ozone and humidity atmospheres, as described previously. When alternative inorganic ionically conductive materials are utilized, appropriate slurry components and reaction conditions may be determined by routine experimentation.

For forming a battery comprising the composite separator, the film from the slurry of inorganic powder and precursor of amorphous ionically conductive metal oxide is cast onto an electrode, typically a cathode, which serves as a substrate, and then dried and cured as previously described to form the composite separator on the electrode. Appropriate electrodes are well known in the art and need not be described. However, it is also within the scope of the invention to produce the separator as a free-standing, self-supporting structure by forming a self-supporting film from the slurry, as previously described with respect to the composite cathode. It is also within the scope of the invention to utilize the composite cathode according to an embodiment of the invention, described previously, in the battery. Subsequently, the battery may be produced from the separator/electrode combination using known methods.

In a composite separator according to an embodiment of the invention, particles of electronically insulating inorganic powder are dispersed in a medium comprising an amorphous, inorganic, ionically conductive metal oxide serving as a binder for the powder. The dispersion of inorganic powder may be uniform or may be random and non-uniform without adversely affecting the effectiveness of the separator. The separator is a separator in the functional and traditional sense of serving to separate electrodes from one another; however, the separator is also an electrolyte (or electrolytic conductor) because it comprises predominantly ionically conductive material. The separator is substantially free of cracks because inorganic powder has been added to the amorphous, inorganic, ionically conductive metal oxide, which would typically be used alone to form a separator. The added inorganic powder changes the structural and chemical composition of the mixture of precursors for the amorphous, inorganic, ionically conductive metal oxide such that cracks are not typically formed during the process of forming the final product. Because the amorphous, inorganic material is ionically conductive, it serves the dual purpose of binder for the inorganic powder and electrolyte for the transport of ions.

The separator according to the invention is suitable for use in a cell (or battery) comprising a cathode and an anode separated by a separator. The invention is particularly suitable for use in a lithium battery, in which the lithium ions will be transported through the separator/electrolyte.

This invention will now be described in connection with the following, non-limiting examples.

Example 1: Preparation of Composite Cathode and Lithium Battery

A dried cathode material (NCM) (obtained from Pred Materials International (New York, N.Y.)) was washed in isopropanol and dried at 200° C. in an ozone-rich air environment for about two hours. A LLZO sol gel precursor solution was prepared by dissolving about 4.5 grams of a lanthanum methoxyethoxide solution (about 12% by weight in methoxyethanol), about 0.65 gram of lithium butoxide and about 0.77 gram of a zirconium butoxide solution (about 80% by weight in butanol) in about 5 grams of methoxyethanol (all chemicals obtained from Gelest, Inc. (Morrisville, Pa.) or Alfa Aesar). The thoroughly-mixed precursor solution was left in a bottle in an inert environment for about 1 to 1.5 hours to help facilitate substantially complete dissolution of the lithium butoxide.

In an inert environment, a slurry was prepared by combining 6 g of the dried cathode material, 1.2 g LAGP (electrolyte powder), 6 ml of the LLZO sol-gel precursor solution, and 0.03 g acetylene black (obtained from Alfa Aesar), and then energy milled for about 80 minutes in an airtight jar. A thin aluminum foil (approximately 50 μm) was cleaned using isopropanol, and the slurry was then cast onto the cleaned foil and exposed to an ozone-rich and low humidity air environment for about one hour. To the exposed cathode structure, more LLZO sol gel solution was infiltrated by spin coating and again exposed to ozone-rich and low humidity air environment for about one hour. Subsequently, the coated substrate was heated to 80° C. for about one hour in the ozone-rich and low humidity air environment. Thereafter, it was calendered for compaction and surface smoothening. To this, an extra layer of LLZO sol gel layer was spin-coated, exposed at ambient temperature for one hour and then heated at 80° C. for one hour, all in the ozone-rich and low humidity air environment.

To complete production of the cathode, the resulting structure was heated to 300° C. in air for about one hour. On this novel cathode-separator combination, a thin layer of LiPON (1.5-2 micron thick) electrolyte was sputtered. Finally, an approximately 2-micron thick lithium anode was evaporated on the LiPON to complete the solid-state battery.

Analysis of the resulting low cost solid-state lithium battery demonstrated that high capacity was achieved and that deep cathode material was accessed during charge-discharge cycling.

Example 2: Preparation of Composite Separator

Aluminum oxide powder from Sigma-Aldrich in the form of nanoparticles (size ~60 nm) was dried at about 150° C. under vacuum for about 24 h. About 2 g of the dried $Al_2O_3$ powder was mixed with 2 ml of LLZO sol gel precursor solution as described in Example 1 into an energy milling jar. The jar was air tight sealed in the inert environment and was energy milled for about 80 min. A 45-micron thick aluminum foil was prepared by wiping with isopropanol and drying at about 80° C. for about one hour. The homogeneously milled slurry was cast onto the clean and dried foil inside an ozone-rich (at least 0.05 ppm) and low humidity (less than about 30 percent relative humidity) air environment to form a sheet. The sheet was let to dry and cure for about one hour in the ozone-rich and low humidity air environment. Subsequently, the sheet was compacted using a clean roller inside the same air environment. Thereafter, one square inches pieces were cut from the sheet and further cured at about 80° C. for about one hour in an ozone-rich and low humidity air environment. The pieces of the sheet were heated at 300° C. for about one hour in air, thus forming a sample of composite separator.

Figure 3:
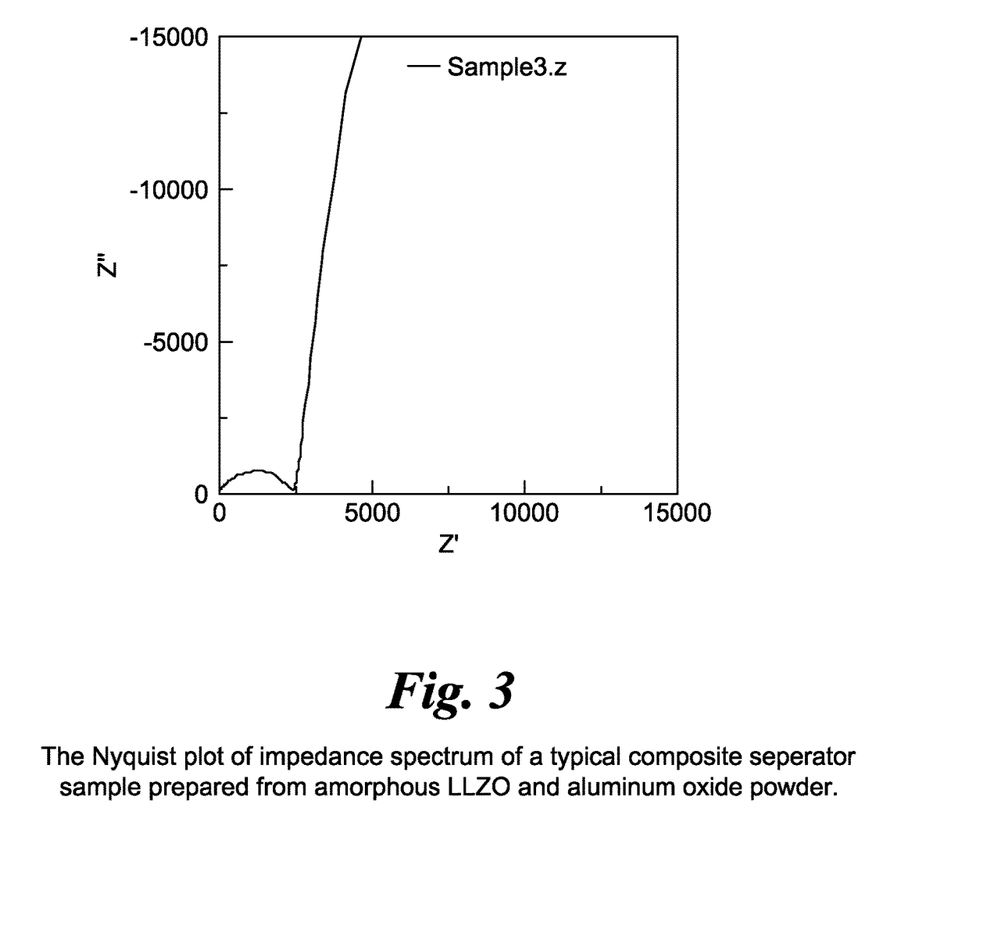
FIG. 3 is a Nyquist plot of impedance spectrum of a composite separator prepared according to an embodiment of the invention.

The ionic conductivity of the composite separator pieces was measured using a Solectron SI 1260 Impedance Analyzer. The Al foil substrate served as one electrode for the measurement while the other electrode was formed by sputtered gold. The impedance spectrum of the composite separator sample (FIG. 3) demonstrates ionic conduction and a lack of short circuits.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A solid composite separator comprising an inorganic electronically insulating powder dispersed in an amorphous, inorganic, ionically conductive metal oxide, wherein the inorganic powder is selected from the group consisting of lithium lanthanum zirconium oxide, lithium carbon lanthanum zirconium oxide, lithium aluminum titanium phosphate, lithium aluminum germanium phosphate and lithium lanthanum titanium oxide.

2. The separator according to claim 1, further comprising a substrate.

3. The separator according to claim 1, wherein the amorphous ionically conductive metal oxide is selected from the group consisting of lithium lanthanum zirconium oxide and lithium carbon lanthanum zirconium oxide.

* * * * *